United States Patent [19]

Anger et al.

[11] Patent Number: 4,925,291

[45] Date of Patent: May 15, 1990

[54] TEMPLE END PIECE FOR THE TEMPLE OF A SPECTACLE FRAME

[75] Inventors: Wilhelm Anger, St. Moritz, Switzerland; Helmut Wiedman, Heilbronn, Fed. Rep. of Germany

[73] Assignee: Eyemetrics-Systems Ag, Chur, Switzerland

[21] Appl. No.: 258,086

[22] Filed: Oct. 17, 1988

Related U.S. Application Data

[63] Continuation of Ser. No. 860,058, May 4, 1986, abandoned.

[30] Foreign Application Priority Data

May 10, 1985 [DE] Fed. Rep. of Germany ....... 3516956
Apr. 30, 1986 [DE] Fed. Rep. of Germany ....... 3614637

[51] Int. Cl.$^5$ ................................................. G02C 5/16
[52] U.S. Cl. ...................................... 351/123; 351/117; 351/122
[58] Field of Search ................. 351/117, 122, 123

[56] References Cited

U.S. PATENT DOCUMENTS

| | | | |
|---|---|---|---|
| 460,576 | 10/1891 | Halbe | 351/123 |
| 4,272,166 | 6/1981 | Bononi | 351/111 |
| 4,389,102 | 6/1983 | Piampiano | 351/123 |
| 4,684,226 | 8/1987 | Anger | 351/123 |

Primary Examiner—Rodney B. Bovernick
Assistant Examiner—Jay Ryan
Attorney, Agent, or Firm—Roth & Goldman

[57] ABSTRACT

A temple end piece for a temple of a spectacle frame has a unit stable in a form composed of an essentially horizontal first segment and a second segment curving downward to the rear in the shape of an arc. Connected to this unit is a third segment formed by a soft, flexible band, the upper end of which is attached to the first segment and the lower end of which is permanently connected to the lower end of the second segment. This band extends in the uncharged state of the temple end piece curved essentially in the shape of an arc, in fact, in a manner similar to the second segment. In its longitudinal direction the band is neither stretchable nor compressible. By virtue of its high flexiblity the band fit the shape of the auricle and/or head of the spectacle wearer when the spectacles are worn in place, so that a large contact area with lower pressures will adjust itself, and any and all pressure points are prevented in this contact area. Owing to the constancy of length of the band the flexible configuration will not detract from the stability of support for the temple of the spectacles.

21 Claims, 4 Drawing Sheets

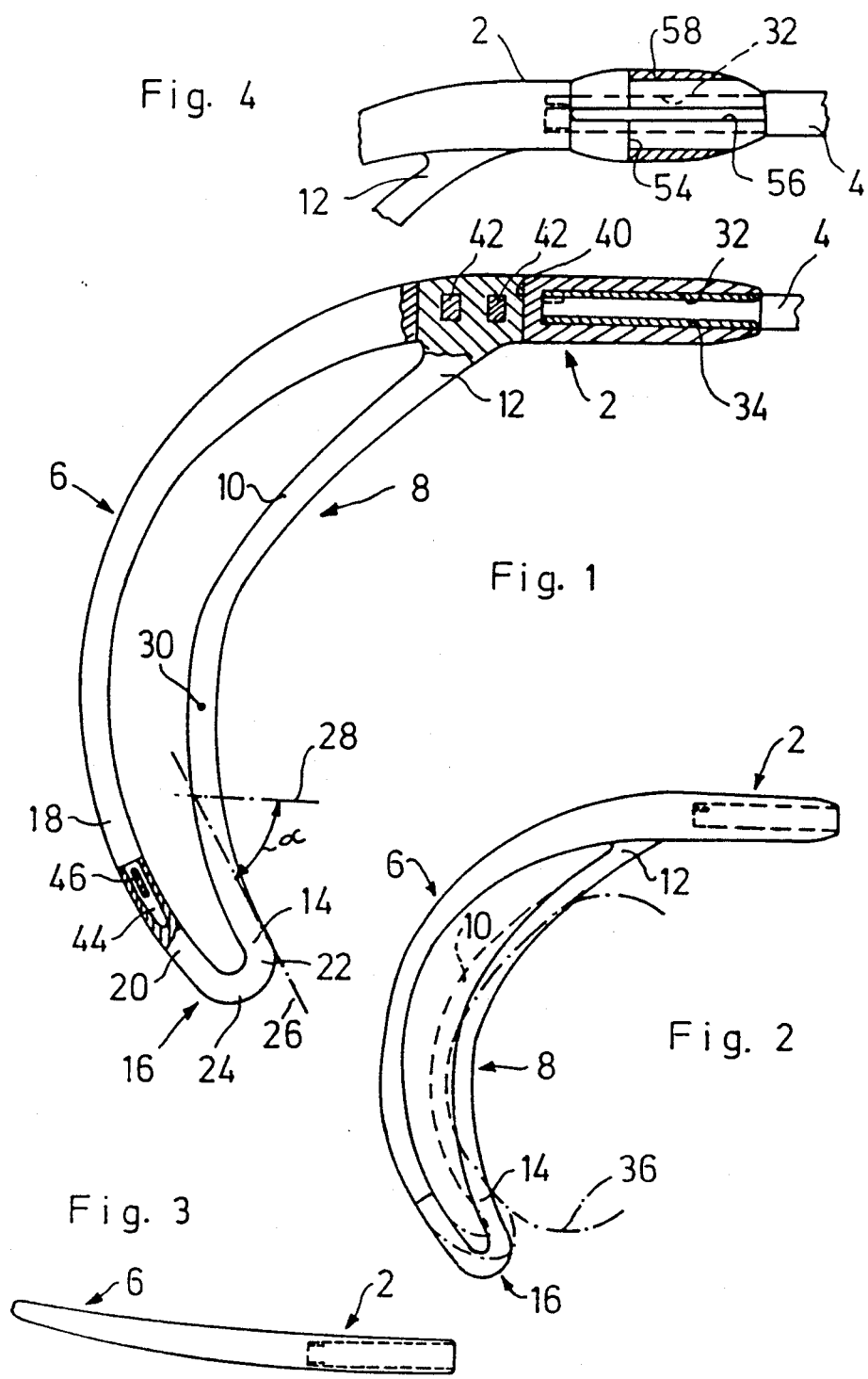

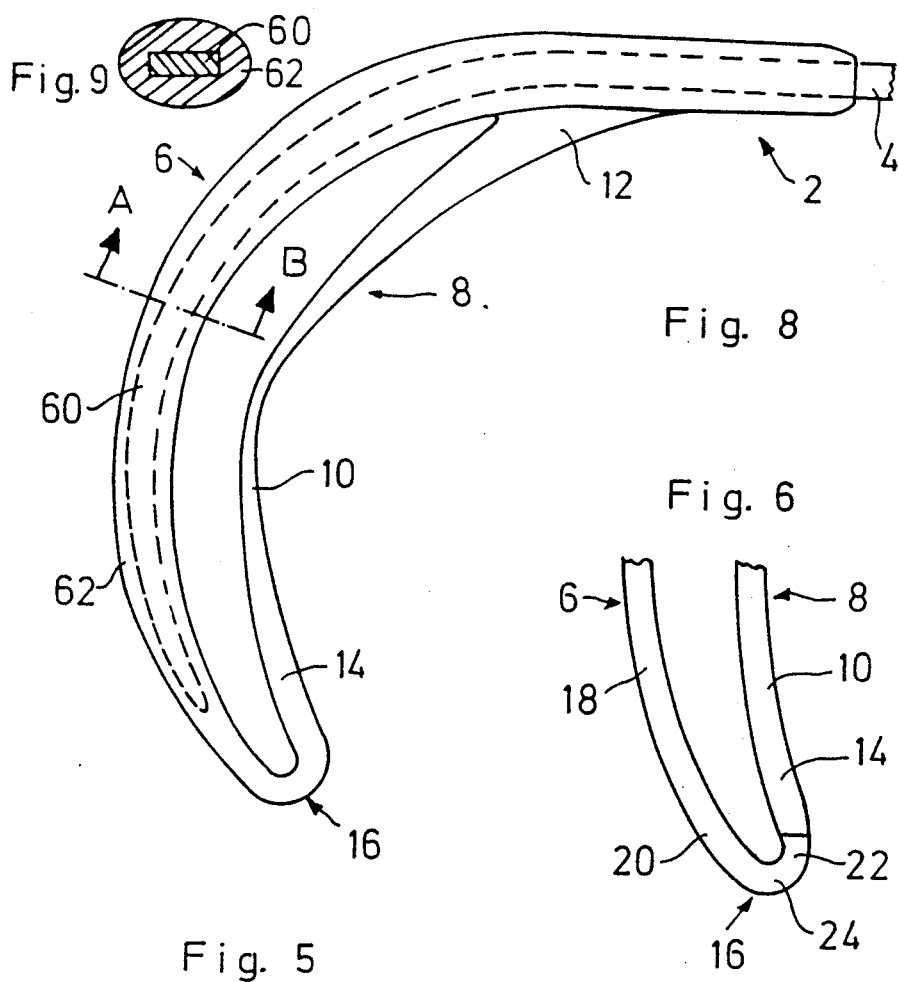
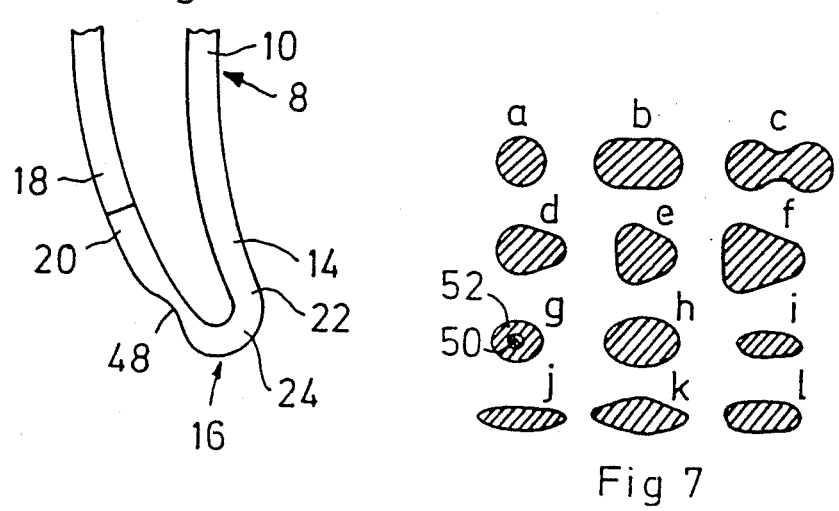

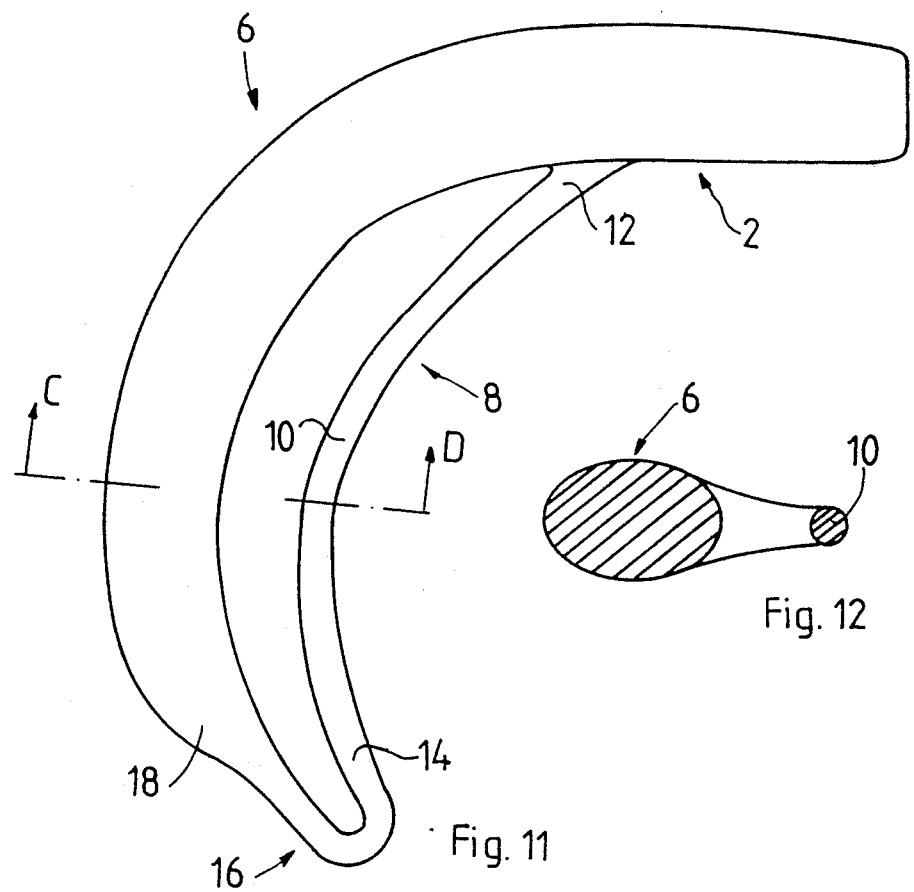
Fig. 11
Fig. 12
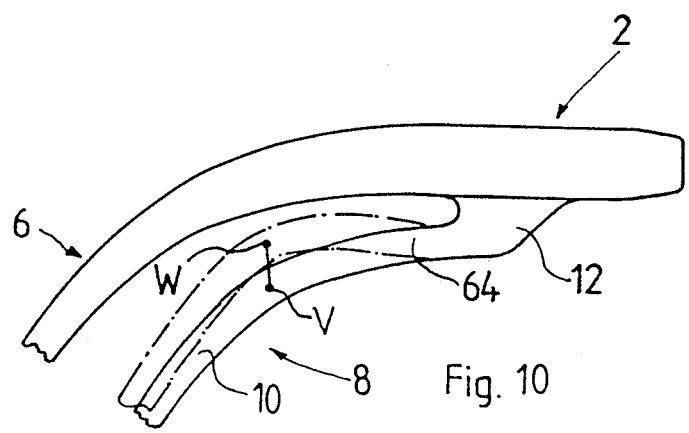
Fig. 10

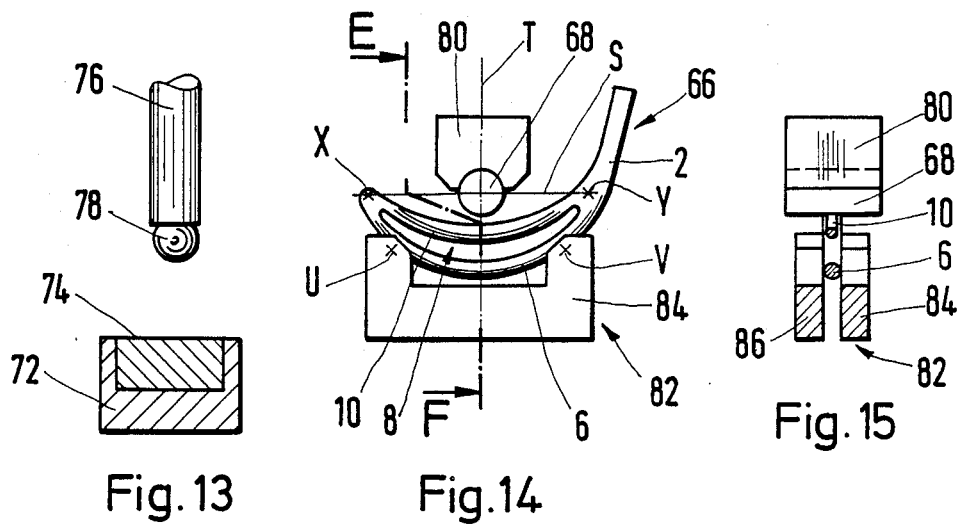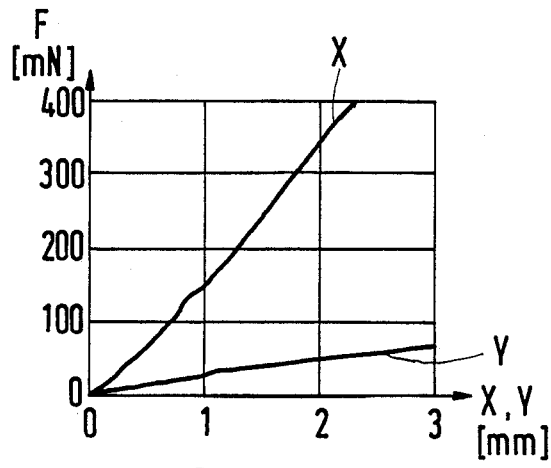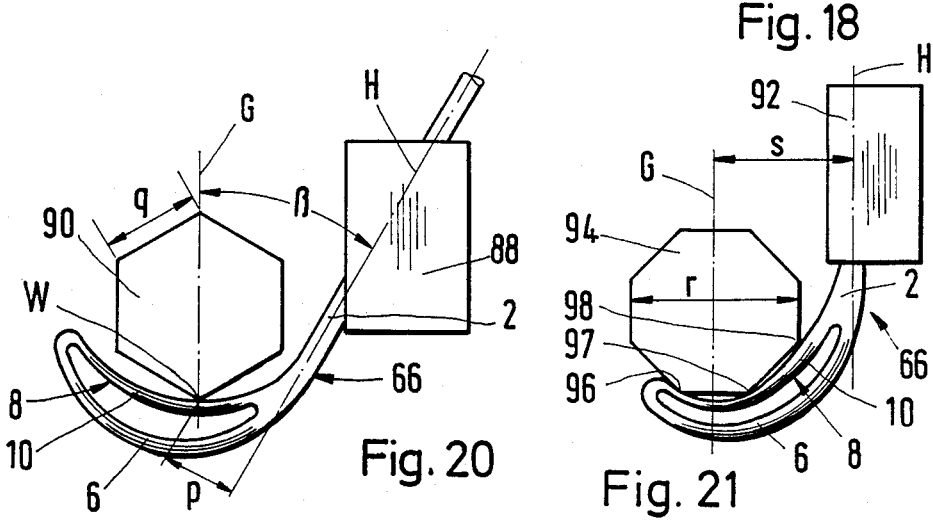

TEMPLE END PIECE FOR THE TEMPLE OF A SPECTACLE FRAME

This application is a continuation of abandoned U.S. application Ser. No. 06/860,058 filed May 4, 1986, abandoned.

FIELD OF THE INVENTION

The present invention relates to a temple.

PRIOR ART

Known in the art is such a temple end piece (U.S. Pat. No. 4 389 102). In this known temple end piece the first segment is the back end of the main part extending in an essentially straight line of a conventional temple. The second segment is formed in one piece with the first segment and extends out from the latter diagonally downward to the rear, as is the case in so-called golf temples. The flexible band forming the third segment is an elastic thread stretched between the lower end of the second segment and a place in the region of the connection between the first and second segments in the manner of a tendon. The third segment runs thus in a straight line between its two ends, is stretched and is under initial stress. When a spectacle frame equipped with this temple end piece known in the art is put into position, the elastic wire in the region of the transition area between the auricle and the skull reposes itself on the auricle or the furrow between auricle and skull, whereby the wire partially winds around the auricle.

This temple end piece known in the art has the advantage of constantly exercising a force on the temple from the stretched wire, which force seeks to pull the temple backward so that the spectacle retains its correct fit on the nose. If, for example, the spectacles should be shifted forward because of an abrupt stressing, this force gets to be great because of the elastic wire under prior tension, in order for it to pull the spectacles back to their proper position. However, posed against this are certain disadvantages. If the elastic wire is only slightly wound around the auricle, the contact area between the elastic wire and the auricle will be small, so that it will result in relatively high pressures in the contact area and thus cause disturbing pressure points. If the looping angle is large, then the tension in the elastic wire will of necessity be greater, so that while the contact area is larger, the resultant action of the forces to be transmitted there will also be great, which in turn will have the consequence that the stressing from pressure does not decrease in a manner corresponding to the enlargement of the contact area. Accordingly, pressure points can scarcely be avoided. A comfortable fit of the spectacles is not achieved. In addition, the transmission of force between the ear and the lower end of the second segment occurs via a stretched area of the elastic wire that is under tension. This area represents a spring that, depending on the stressing, is more or less stretched, so that the temple end piece does not assume any certain position in the vertical direction, but rather is situated higher or lower, depending upon the forces at work, and can in unfavorable circumstances even carry out vertical oscillations. The spectacles are thus not as still as possible and held in a constant position relative to the eyes.

Also know in the art from U.S. Pat. No. 4 389 102 is a temple end piece in which the elastic wire is replaced with a tube closed at one end and slotted in the longitudinal direction, which tube is shifted in such a manner onto the first and second segments of the temple end piece that the transition area between the first and second segments protrudes outward from the tube through the slot and the lower end of the second segment reposes in the closed end of the tube. The tube is pushed far enough onto the remainder of the temple end piece that it is stretched in its longitudinal direction and extended and, because of this, is radially contracted in its area extending like a tendon. While this lends the tube a certain concavity on the side of it facing the auricle, which should make possible a relatively large contact area with the ear, this larger contact area is still accomplished because of the stretching of the tube in consequence of increased longitudinal tension, which simultaneously makes the tube rigid and because of this both takes away its desired elastic resilience vertical to the tendon formed by it and also hardens and stiffens in the contact area and thus in turn promotes the formation of pressure points.

OBJECT OF THE INVENTION

The present invention is based on the objective of designing the temple end piece of this genre in such a manner that it will both guarantee a secure hold of the temple as well as prevent the formation of pressure points and thus increase the comfort in wearing of the spectacles equipped with this temple end piece.

SUMMARY AND ADVANTAGES OF THE INVENTION

In the temple end piece in accordance with the present invention the third segment consists of a band which is at the same time both flexible and also essentially inalterable in its length. This band is already curved in the form of an arc in the uncharged state of the temple end piece. It will be understood that this band forming the third segment has these characteristics as part of the temple end piece (and, for example, not solely prior to being joined with the first and second segments, but no longer after being joined together). It will also be understood that the assertions made with respect to the properties of this band, such as, e.g., the statement "flexible" and the indication "essentially neither stretchable nor compressible" are descriptions which refer to the use of the temple end piece for which it is intended and to the stresses which arise in conjunction with this. When put to its intended use, the temple end piece is charged with the forces at work on the temple end piece while the spectacles are being put on or taken off, as well as the forces that are required for keeping the spectacles in the desired position when the spectacles are worn in place. The unstressed state of the temple end piece is that in which the temple end piece is found when the spectacles have been removed when the temple end piece, for example, is held at its first segment and is subject to the force of gravity, but is otherwise free of externally acting forces. The flexibility required of the band means thus that the band should be bendable through the forces arising when put to the use intended, and most especially through the forces occuring when the spectacles are worn in place and without any particular additional stressing at the third segment. The constancy of length required of the band forming the third segment means that the length of this band (measured along its axis) is essentially not changed by the forces arising in the charged state, especially by the forces occurring with the spectacles worn in place without any additional stressing. The fact that the band in the uncharged state of the temple end piece is curved backward in the form of an arc means the band will essentially retain this certain arc-shaped, curved pattern as long as the temple end piece is unstressed in the meaning stated above and after being stressed assumes it once more. For example, a change in the position of the uncharged temple end piece in space will for all purposes change the pattern of the arc-shaped curved area not at all.

The stability of form prescribed for the unit formed by the first and second segments will be present—analogous to the above descriptions concerning the third segment—when the temple end piece is put to its intended use. This does not exclude certain spring-like properties of the first and/or second segments. This stability of form, however, guarantees that the unit made from the first and second segments will form a sufficiently firm direction of retention for holding the third segment, which in the charged state of the temple end piece will not be sufficiently self-supporting.

Finally, let it be made clear that the terms "up", "down", "downward" and "forward" refer to the temple end piece as a component of spectacles worn by a wearer of spectacles holding his head upright, whereby "forward" indicates the direction from the temple end piece to the middle portion of the spectacles.

In the temple end piece in accordance with the present invention the flexible band forming the third segment extends neither in a straight line between its two ends connected to the remaining segments, nor is it under tension. Rather, it extends curved in the shape of an arc and without any resulting prior tension. This means that the flexible band has a certain amount of slack, i.e. a greater length than is necessary for immediately bridging over the intervals between its two ends. When spectacles outfitted with a temple end piece made in accordance with the present invention are put into position, the flexible band curved in the shape of an arc reposes against the auricle and/or skull from behind, preferably against the furrow between the auricle and the head of the spectacle wearer. When the arc-shaped pattern of the flexible band happens to coincide with the form of the auricle or the stated furrow, a contact is immediately achieved between the band and the auricle and/or the skull in a large area of contact. But even if this coinciding does not occur at first, the band will adapt to the form of the auricle and/or the furrow because of its flexibility, so that a larger angle of looping and a longer area of contact result. This property of the band means that it has a great adaptability. The adaptation takes place without any increase in the pulling force in the band, because the band does no need to be extended through elastic stretching, but the band length necessary for the relatively large angle of looping is a priority already present, viz., already in the uncharged state of the temple end piece. This automatic reposing of the band without an increase in the pulling force in it is made possible by its flexibility and the "excess length" already present in the uncharged state and resulting from its pattern curved in the shape of an arc. By virtue of this a larger area of contact is achieved with correspondingly lower pressures, whereby the pressures are low not only in the middle, but pressure points are also avoided, because the band, owing to its flexibility, would yield to a relatively high force aligned with any one pressure point.

The carrying and supporting forces working on the temple end piece from the ear and/or head are introduced via the two relatively short areas of the band into the remainder of the temple end piece, which areas are located between the arc-shaped, curved area of the band standing in contact with the ear and/or skull and the first and second segments of the temple end piece. Since no notable elastic stretching or compressing occurs in these short areas, they have no spring-like properties which might result in instabilities in the support of the temple end piece.

The fact that the area curved in the shape of an arc in its uncharged state has essentially always the identical shape makes it easy to remove the spectacles and especially simple to take them off. By guiding the temple and thus the inherently stable unit composed of the first and second segments of the temple end piece its third segment can also be guided simultaneously when the spectacles are being put on since it will assume a defined position with respect to the first and second segments.

The temple end piece in accordance with the present invention will thus allow for a comfortable, pressure point-free and self-adapting fit of the temple end piece on the ear and/or head on the spectacle wearer with a simultaneously secure and constant support of the attached temple. And finally, it will especially not be made more difficult to put on the spectacles with the temple end piece in accordance with the present invention.

As may be seen from the above description of the present invention, one essential characteristic of the temple end piece in accordance with the present invention is the flexibility or pliability of the band constituting its third segment. This flexibility should be as high as possible so that the band will be able to adapt itself as extensively as possible to the geometry of the auricle and/or the skull; but it should also be of such a nature that the pattern curved in the shape of an arc will also be retained in the uncharged state.

Taking these two requirements into account, the ductility of the band should be ascertained. Since it is held at both its ends by the inherently stable unit formed by the first and second segments, it is not necessary for the band also to be fixed in place and self-supporting at one end. Rather, with the optimum automatic adaptability of the flexible band its ductility is so great that in cases where the band is fixed solely at its upper end, but not at its lower end, a short upper area of the band could transfer, if necessary, to the first segment a certain supporting force with the spectacles worn in place, but the predominant area of the flexible band would solely hang downward without contributing to the support or retention of the spectacles.

In the preferred embodiment of the temple end piece provision can be made for the area of the band curving downward in the shape of an arc to connect to a connecting area curving upward to the rear in the shape of a hook, which transforms into the second segment and for the third segment, including this connecting area, to be composed of the same soft material, by contrast to which the second and usually the first segment as well of the temple end piece would consist of a different and firm material. This formation of at least two materials makes it possible for each of the materials to conform as well as possible to the requisite characteristics. The firm material for the first and second segments makes it possible, for example, to have with a narrow cross-section sufficient stability of the unit formed by the two segments while simultaneously retaining the elasticity present. For the third segment a supple, easily bendable, soft material will preferably be chosen with negligible restoring force when deformed and simultaneously little deformation residue after being deformed. Thus the materials suited for the third segments will be especially thermoplasts and rubber, preferably, in turn, silicone rubber, thermoplastic polyurethane elastomers and polyether block amides.

The connecting area curved in the shape of a hook of the preferred embodiment of the present invention briefly described in the above improves the deforming pattern of the third segment in a twofold manner. The pulling force arising in the area of the band curving in the shape of an arc when the temple end piece is charged will cause the shank of the hook-shaped connecting area aligned with the second segment to be bent upward, through which the hook tip will be shifted forward and thus will fit more strongly from the rear and possibly from below against the auricle. This means, in other words, an automatic hooking of the lower end of the temple end piece behind and/or below the ear and thus will enhance the reliability of the retention of the spectacle. In addition to this advantage, a further advantage accrues from the fact that the described deformation of the hook-shaped connecting area will shift upward the lower end of the area of the band curving in the shape of an arc, and because of this an additional length of band will be available for automatically looping around the auricle without making it necessary to stretch out the length of the band.

Additional embodiments of the present invention may be seen in the subsidiary claims, as well as from the following description of embodiments with reference to the drawings. The following is shown in the illustrations:

FIG. 1 is a side view, partially in section, of a preferred embodiment of the temple end piece;

FIG. 2 is a side view of the temple end piece as seen in FIG. 1 on a smaller scale to illustrate its pattern of deformation;

FIG. 3 is a top view of the temple end piece as seen in FIG. 2;

FIG. 4 is a representation in section of a variant of the embodiment as shown in FIG. 1;

FIG. 5 is a representation in section of a further variant of the embodiment as shown in FIG. 1;

FIG. 6 is a representation in section of a further variant of the embodiment shown in FIG. 1;

FIG. 7 is various profiles which the band forming the third segment can have;

FIG. 8 is a side view of a second embodiment of the temple end piece;

FIG. 9 is an enlarged sectional representation of A-B in FIG. 8;

FIG. 10 is a side view in section of a third embodiment of the temple end piece;

FIG. 11 is a side view of a further embodiment of the temple end piece;

FIG. 12 is an enlarged sectional representation of C-D in FIG. 11.

FIG. 13 shows a side view, partially in section, to explain a preliminary test in connection with a first test to prove the adaptability of the temple end pieces according to the invention;

FIG. 14 shows a schematic side view of a first test arrangement for carrying out the first test;

FIG. 15 shows a sectional representation according to E-F in FIG. 14;

FIG. 16 shows a top view of a test body used in the first test;

FIG. 17 shows a side view of the test body assigned to FIG. 16;

FIG. 18 shows a bottom view of the test body assigned to FIG. 16;

FIG. 19 shows a diagram representing the test results of a second test;

FIG. 20 shows a schematic lateral view of a second test arrangement for carrying out the second test; and FIG. 21 shows a schematic side view of a third test arrangement for carrying out a third test.

The temple end piece as shown in FIG. 1 through 3 is comprised of a first segment 2 essentially extending in a straight line, which segment is permanently connected to a straight shaft of the temple of a spectacle frame. Of this shaft only the shaft end 4 is visible in FIG. 1. The straight first segment 2 has an essentially flat-oval profile (not shown). At left in FIG. 1 and 2 a second segment 6 connects smoothly and evenly to the first segment 2, which second segment 6 curves first arc or crescent-shaped downward and to the left (as seen in FIG. 1). This second segment tapers down with increasing interval from the first segment 2; its profile transforms gradually from the flat-oval profile of the first segment 2 into a circular profile. The first segment 2 and the second segment 6 are permanently attached to one another and by virtue of a suitable choice of materials and their dimensions form an inherently stable unit, i.e. a unit which, when spectacles equipped with the described temple end piece are worn in piece, will retain its shape and will, if necessary, will elastically pliable by virtue of a certain spring-like elasticity.

In FIG. 1 and 2 at the right of the second segment 2 a third segment 8 of the temple end piece is arranged. A flexible band 10 with a circular profile forms this third segment 8, as can be seen in FIG. 7a. The band 10, being thus the third segment 8, is permanently connected at its upper end 12 with the unit composed of the two segments 2 and 6, specifically in the manner shown in the transition area between the first segment 2 and the second segment 6. From this transition area the band 10 emerges outward from below, as may be seen especially in FIG. 2. As FIG. 1 and 2 clearly show, the band 10 has a crescent-shaped or arc-shaped curved pattern, whereby the outer side of the curvature faces back to the first segment 6 and the inner side of the curvature faces forward, viz. toward the ear of the spectacle wearer with the spectacles worn in place. The area with this crescent-shaped curvature extends practically over the entire length of the band 10 from its upper end 12 to the lower end 14 of the third segment 8. In addition to the above described curvature in the drawing plane of FIG. 1 and 2, the band 10 can also be curved vertically to this drawing plane, and not simply once, but repeatedly, in order thereby to furnish the third segment approximately the extent in space which the furrow between the auricle and the head of the spectacle wearer has on the rear side of the ear.

The band 10 is permanently connected to the unit composed of the first segment 2 and the second segment 6 not only at its upper end 12, but also at its lower end 14. In the preferred embodiment shown this connection is produced by means of a a hook, which connecting area extends between the lower end 14 of the band 10 and the lower end 18 of the second segment 6. The hook-shaped connecting area 16 has a rear shank 20, a short front shank 22, and a torus-shaped sector 24 situated between these two shanks, which sector has a relatively small radius of curvature and extends out over approximately 180°. The lower end 14 of the band 10 transforms smoothly into the shank 22, and the shank 20 transforms smoothly into the lower end 18 of the second segment 6, whereby the profile from the end 14 to the end 18 is essentially unchanged, but rather continues the circular profile of the band 10.

A tangent 26 to the band 10 in its lower area forms an angle $\alpha$ with the longitudinal axis (not shown) of the first segment 2, to which a parallel 28 has been drawn in FIG. 1; this angle is less than 90° and in the embodiment depicted has a value of 65°. The band 10 extends increasingly steeper upward from the lower end 14 out as far as its backmost position 30, shown in FIG. 1 as farthest to the left. With increasing proximity to the upper end 12 of the band 10 the latter extends to become increasingly flatter. Because of the above described conformation of the temple end piece the second segment 6 and the third segment 8 in the view shown in FIG. 1 and 2 form the shape of a slender moon crescent.

The top view as shown in FIG. 3 of the temple end piece shows that the first segment 2 and the second segment 6 are bent slightly inward, i.e. toward the head with the spectacles worn in place.

The above described temple end piece can be formed in one piece with the temple shaft or made separately from it and ultimately joined with the shaft end 4. In the preferred embodiment shown in FIG. 1 through 3 the temple end piece is first shown as made separate from the temple shaft and then connected to its shaft end 4. For this purpose the first segment 2 has a longitudinal borehole 32 into which a socket composed of a suitable plastic, for example, has been inserted. The shaft end 4 in turn is inserted into the socket 34. The borehole 32 and the shaft end 4 form a pressure-fitting with the intervening socket 34. Both on the outer side of the cylindrical shaft end 4 and on the inner side of the borehole 32 appropriate protrusions can be provided which press into the socket 34 and by this means supplement the force-locking connection caused by pressure-fitting with form-locking. The above described connection between the shaft end 4 and the temple end piece makes it possible for the temple shaft and the first segment 2 to rotate with respect to one another during assembly on their common longitudinal axis in order to furnish segments 6 and 8 of the temple end piece a more or less large inclination inward, i.e. toward the head with the spectacles worn in place.

The unit composed of the two segments 2 and 6 should be inherently stable and the third segment 8 should have high flexibility. This is achieved in the preferred embodiment shown in FIG. 1 through 3 by having the first segment 2 and the second segment 6 be made of a different material than the third segment 8. As for the material of which the two segments 2 and 6 is made, this will consists of, for example, a duroplastic or thermoplastic plastic, e.g. a polyetherimide or polyether sulfone. In principle, any material can be considered which is suitable for composing the weight-bearing elements of conventional spectacle frames. The band 10 forming the third segment 8, should be both flexible and bendable to a high degree and also essentially stable in length, i.e. neither stretchable nor compressible. The band 10 will have this property when the temple end piece is put the intended use, as explained in detail in the introductory description. In addition, the band 10 in the uncharged state of the temple end piece will have a curved pattern, as shown in FIG. 1 and 2. The band will have this pattern, no matter how the temple end piece is directed in space, i.e. regardless of the direction in which the earth's attraction is pulling on the elements of the temple end piece. In this sense the band 10 has a certain stability of form despite its high flexibility.

The third segment 8 of the temple end piece is that which chiefly or exclusively is in contact with the head and/or auricle of the spectacle wearer with the spectacles worn in place. FIG. 2 shows this in simplified form with the pattern of the third segment 8 and the connecting area 16 when worn in place being depicted in broken lines; in addition, the curve of the furrow 36 between the auricle (not shown) and the head (not shown) of the spectacle wearer has been indicated in dash-dots. The band 10 runs along this furrow when the spectacles are worn in place. As a comparison, the pattern of the third segment 8 and the connecting area 16 with the temple end piece in the uncharged state is shown in complete lines in FIG. 2. The third segment 8 extends thus, when the spectacles are worn in place, along the furrow 36 in such a manner that the band 10 and the earn (not shown) in the region of the furrow 36 come into contact over a relatively large length of the band 10, so that a relatively large area of contact is present between the band 10 and the auricle and/or the skull.

Usually the curvature of the band 10 in its uncharged state and the curvature of the furrow 36 (or the pattern of another area of the ear and/or head intended for contact with the temple end piece) will not coincide. When the spectacles are put in place, the band 10 and the auricle, for example, first come into contact with one another only at one point of contact, i.e. in a small surface area. Because of this, in turn, owing to the high flexibility of the band 10, its shape is altered; it is deformed in such a manner that it even comes into contact with the auricle in the areas adjoining the initial point of contact till ultimately the band 10 has molded itself in its shape to the geometry of the auricle over the entire length of the band. This is made possible for the band by its high degree of flexibility. In addition, this is also made possible by virture of the fact that the band 10 in its uncharged state extends curved essentially in the shape of an arc, i.e. has a greater length than its necessary for directly connecting the sites assigned to the two ends 12 and 14. The length of the band and its axis between the two ends 12 and 14 is larger by what is here termed as an "excess length" than the interval between the sites assigned to the two ends 12 and 14. This excess length makes it possible for the band 10 to deform itself to adapt to the geometry, of the auricle and/or the furrow 36 without having to be stretched for this purpose and thus cause an increase in the pulling forces in the band 10. This deformation of the band 10 consists essentially of changes in the radiuses of curvature at different points of the band 10, whereby it can come to the point of forming kinks. The curvature at various points of the band can not only alter in the drawing plane of FIG. 1 and 2, but also vertically to this, so that a three-dimensional, multi-winding pattern can conceivably result.

The formation of a large contact area described above in detail between the band 10 and the auricle and/or the head is essentially not achieved through stretching and thus not through any notable increase in the pulling forces in the band, so that the enlargement of the contact area has its affect in a corresponding decrease in contact pressures. Because of the deformability of the band 10 to the point of kinking, no pressure points will arise even on protrusions or cartilage edges in the auricle. Thus an utterly comfortable fit of the temple end piece against the ear and/or head of the spectacle wearer is guaranteed.

The supporting and carrying force exercised on the third segment 8 and the band 10 is transferred by the band 10 to the remainder of the temple end piece via two short areas of the band 10 that represent the connection between the adjoining area of the band 10 and the first segment 2 and the connecting area 16. The short area at the upper end 12 is usually charged with pressure while the area at the lower end 14 is usually charged with pulling. The pulling and pushing forces, however, to not cause any notable stretching or compression of the band 10, so that the temple end piece assumes a stable position relative to the ear and head and this position is not dependent on the magnitude of these pulling and pushing forces. Were this not the case, the acceleration and retardation motions caused by head movements, acting on the spectacles and intended to be introduced from the band 10 into the contact area could, for example, change the position of the temple end piece relative to the ear and head and even induce rocking motions and oscillations.

The properties of the band 10 described above in detail are afforded to the band 10 through its shape and the properties of the material or materials of which it consists. With the same band profile and identical cross-sectional area the bending resistance will increase and flexibility will decrease if hardness and the module of elasticity of the material increase. In principle, there are numerous possibilities for selecting material properties and dimensions of the band and adjusting them one to the other in such a manner that the band will be afforded the characteristics as described in the foregoing. Preferably, rubber or a soft, elastic plastic will be employed, more specifically a silicone rubber, a thermoplastic polyurethane elastomer, a polyether block amide, a soft chloride or a polyethylene. For this purpose, the Shore-D hardness, measured according to DIN 53505, will be the range of from 5 to 60, especially in the range of from 20 to 50. At 20° C. the modulus of elasticity will preferably be in the range of from 1 to 700 MPa. The modulus of shear and the modulus of torsion will preferably be in the range of from 0.5 to 400 MPa, and especially in the range of from 5 to 170 MPa. The Poisson's number should have a high a value as possible so that the ratio of modulus of torsion to modulus of elasticity will be as high as possible. The surface of the band 10 should be soft and supple and should moreover fulfill those requirements set for the material of spectacles, viz. compatibility with the skin, resistance to sweat and oil, resistance to light and resistance to aging.

In the preferred embodiment depicted in FIG. 1 through 3 the band 10 can have a circular profile over its entire length as that shown in FIG. 7a with a diameter of 2 mm and be made of a polyether block amide, as, for example, a material marketed by the firm of Atochem Germany GmbH of Duesseldorf under the trade name of "Pebax 2533 SN 00". This has a Shore D hardness of 25 and a modulus of elasticity of 20 MPa.

Besides, a further suitable material for the band 10 of the embodiment shown in FIGS. 1 to 3 is a thermoplastic polyurethane elastomer, for instance the material sold by Bayer AG, Leverkusen, under the name "Desmopan 786". This material has a Shore-D-hardness of 33 and a modulus of elasticity in the range from 30 to 70 MPa.

In the preferred embodiment depicted in FIG. 1 through 3 the band 10 and the connecting area 16 are made together in one piece, so that even the connecting area 16, including its shank 20, possesses a high degree of flexibility. Because of this, the deformation pattern of the third segment 8 is affected in a manner as will be explained in the following with reference to FIG. 2. In the charged state of the temple end piece a pull is exercised by the end 14 of the band 10 on the short shank 22 of the connecting area 16. Now if the shank 20 of the hook-shaped connecting area 16 is highly flexible, it will also be curved because of this pulling force in addition, so that the connecting area 16 altogether will be turned upward by approximately the upper end of the shank 20 and thereby come into the position depicted in FIG. 2 in broken lines. On the one hand the end 14 of the band 10 will travel farther upward (in comparison to the uncharged state of the temple end piece), so that the excess length as explained in the above will be enlarged and thus even more excess length will be available for fitting the curve of the band to the geometry of the ear. On the other hand, the sector 24 will be shifted slightly forward by this while the angle α will simultaneously be decreased, which means that the connecting area 16 approaches the auricle from behind and beneath and hooks on to the ear practically from beneath and behind. Through this the angle of looping of the auricle is enlarged and the anchoring of the temple end piece on the ear is increased. As will be seen from the above description, this is a process that takes its course automatically when the spectacles are put on and that requires no additional manipulation on the part of the spectacle wearer.

The above described characteristic is made possible by the high degree of flexibility in the shank 20. Too great a length in the latter would impede the retaining function which the first segment and the second segment 6 fulfill for the third segment 8. The shank 20 will preferably have a length that constitutes 5% to 30% of the length of the second segment 6.

The temple end piece described, in which the first and second segments on the one hand and the third segment 8 with the connecting area 16 on the other are composed of different materials, can principally be made in such a manner that the elements made of differing materials can be made separately and then joined with one another in an appropriate manner. In addition, the three segments 2, 6 and 8 the connecting area 16 of the temple end piece can be produced from two different materials simultaneously by injection molding in one and the same injection mold die. The embodiment illustrated will preferably be produced by injection molding in such a manner that first of all the first segment 2 and the second segment 6 are made together in an initial injection mold die and that following this, this previously produced unit formed by the segments 2 and 6 will be inserted into a second injection mold die and the third segment 8, together with the connecting area 16, will be injected onto it. For this purpose the first segment 2 has an aperture 40 running through from top to bottom, through which the material for the third segment 8 and the connecting area 16 is injected from above (as seen in FIG. 1) and which ultimately is filled in with this material. For a better attachment of the upper end 12 of the band 10 on the first segment 2 the latter has two bars running vertical to the drawing plane at right angles through the aperture 40, which bars are enveloped circumferentially by the material of which the third segment 8 is made.

At the lower end 18 of the second segment 6 a thorn 44 is formed on which has a smaller diameter than the end 18 has. This thorn is surrounded radially on the outside by the material of the shank 20 and has a transverse aperture 46 which is filled in with the material of the shank 20, so that the thorn 46 and the shank 20 are also connected to one another by form-locking.

There are numerous variants of the above described preferred embodiment that are possible. Some of these variants are shown in FIG. 4 through 7, in which elements already described with reference to FIG. 1 through 3 are given the same reference numbers as in FIG. 1 through 3 are not described anew. Instead, solely the differences to the previously described preferred embodiment are described.

In the variant as shown in FIG. 5 the shank 20 is provided with a recess 48 through which the cross-sectional area of the shank 20 is decreased in the vicinity of the recess 48. This decrease in the cross-section weakens the shank 20 and thus diminishes is resistance to bending. In this manner the bending pattern of the shank 20 can be affected and controlled. An effect on the bending pattern of the shank 20 is also accomplished by the thorn 44 as seen in FIG. 1, but which increases the bending resistance of the shank.

While in the preferred embodiment as seen in FIG. 1 through 3 the connecting area 16 and the third segment 8 are produced in one piece and are made of the same material, in the variant shown in FIG. 6 the connecting area 16 and the second segment 6 are produced in one piece of the same material, so that the transition from the harder to the softer material between the short shank 22 and the lower end 14 of the band 10 is the result. In this variant those special characteristics are foregone that result when the connecting area 16 is produced from the same material as the third segment 8 and it has a highly flexible shank 20. These particular characteristics are described above in detail.

As seen in FIG. 1 through 3, the band 10 has a circular profile as shown in FIG. 7a, which profile the band 10 has from its upper end 12 to its lower end 14 and which even the connecting area 16 also has, whereby the cross-sectional area is constant over the entire length of the band 10 and of the transition area 16 as well. Deviations from this are possible. In addition to the profile seen in FIG. 7a, FIG. 7 shows eleven examples for possibilities for other profiles for the band 10 in FIG. 7b through 7l. By the choice of profile the bending suppleness and pressure rigidity of the band can be affected. For example, a flat-oval profile, as shown in FIG. 7h, 7i and 7j, will have a greater bending resistance in the direction of its longer axis as vertically to it. Various profiles can be provided over the length of the band 10. One advantageous variant of the embodiment shown in FIG. 1 through 3 consists of letting the band 10 have a profile as seen in FIG. 7l at its upper end and a profile as shown in FIG. 7h at its lower end, an between either of its ends a profile essentially that shown in FIG. 7d.

The band 10 can be homogeneous and massive, i.e. be made of solely one material which fills the entire cross-sectional area of the band. In addition, the band 10 can also be nonhomogeneous, i.e. made of several different materials, an example of which FIG. 7g depicts, according to which the band 10 has a thread-shaped core 50 and a cladding 52 surrounding the core. The thread-shaped core 50 can consist of stranded wire which serves to stiffen and solidify the band 10 in its longitudinal direction, and in this manner keep its ductility and compressibility at a minimum, but simultaneously, owing to its own very slight cross-section, will be resilient and flexible upon the appearance of shearing forces, i.e. forces in the drawing plane of FIG. 7. This core 50 is surrounded by a cladding 52 made of very soft plastic, which lends it a relatively large surface and has a very low hardness, so that the cladding 52 can adapt itself to the auricle and/or the head and conform to every uneven spot.

In addition, the band can be formed of a small tube or of a foamy material so that it is non-homogeneous in the fine range.

One variant of the connection of the temple end piece to the shaft end 4 is shown in FIG. 4. In this variant the first segment 2 is equipped on its outside with a shoulder 54 pointing to the right in FIG. 4. In addition, it has a slot 56 extending in the direction of its longitudinal axis. The shaft end 4 is inserted into the longitudinal borehole 32 without an intervening socket 34. On the outside a clamping sleeve reposes on the second segment 2, which sleeve presses the two halves of the first segment 2 separated from one another by the slot 56 and thereby clamps in the shaft end in the longitudinal borehole 32 and holds it fast. The clamping sleeve is slid onto the first segment 2 to the right (as seen in FIG. 4) far enough that its left end reposes against the shoulder 34. The outside of the clamping sleeve 58 and that of the area of the first segment 2 constituting the shoulder 54 merge into one another without a ridge. The connection described with reference to FIG. 4 will make it especially easier for fitting the spectacles equipped with the temple end piece since it will make it possible for the relative position of temple end piece and temple, i.e. the depth of insertion of the shaft end 4 into the longitudinal borehole 32 and the rotating position of the temple end piece with respect to the longitudinal axis of the temple, to be fixed initially by the person fitting the spectacles by adjusting clamping sleeve 58.

In the following further embodiments of the present invention are discussed, whereby attention will be devoted to the difference of these embodiments to the preferred embodiment as shown in FIG. 1 through 3. Elements of the embodiments shown in FIG. 8 through 11 which coincide with the elements of the embodiment shown in FIG. 1 through 3 are assigned the same reference number and for the sake of avoiding repetition are not explained yet again.

In the second embodiment as shown in FIG. 8 a part in the shape of a crescent is formed in one piece with the shaft end 4, which, for example, like the temple may be composed of metal or any relatively firm plastic. This part constitutes a core 60 for the first segment 2 and the second segment 6 of the temple end piece, which is moreover essentially the same in form as in the preferred embodiment as seen in FIG. 1 through 3. This core 60 is surrounded by a cladding 62 composed of the material of which the band 10 forming the third segment 8 is made, whereby this cladding 62, will have been injected, for example, around the core 60. In this manner the entire temple end piece is given a surface having the same softness and suppleness such as only the surface of the third segment in the preferred embodiment has and which is caused by the properties of the material constituting the surface of the band 10. Yet the insertion or core 60 sees to it that the unit composed of the first segment 2 and the second segment 6 will have the requisite stability of form.

In addition to the structure of the first segment 2 and the second segment 6 composed of the core 60 and the cladding 62, the second embodiment exhibits the further peculiarity of the fact that the cross-section area and the profile of the band 10 change over the length of the latter. As seen in FIG. 8, the band 10 in the region of the point 30 is slender and thin. There it shows a profile as depicted in FIG. 7a. This slender area in the approximate shape of a thread is—when it is formed of the same material as band 10 in FIG. 1—deformable through significantly smaller forces than is the band 10 of the embodiment shown in FIG. 1. In the vicinity of the spot 30 such a slender and thread-shaped configuration of band 10 will be admissible since the areas of the band 10 bordering at the top and bottom on the thread-shaped area see to it that the curved pattern of the third segment 8 is preserved in the uncharged state and that the supporting and carrying forces from the ear and/or head are transferred to the temple end piece. As seen in FIG. 8, the band 10 becomes increasingly wider above the thread-shaped area, whereby its cross-sectional area also increases. In the region of the upper end 12 the band 10 ultimately has the profile seen in FIG. 7b. In a similar manner the width and cross-sectional profile are attained as has been provided for in the preferred embodiment. The embodiment shown in FIG. 8 thus demonstrates that in those areas of band 10 in which no notable pulling or pushing forces occur in the charged state of the temple end piece and which do not essentially contribute to maintaining the curved pattern in the shape of an arc of the third segment 8 the band 10 can be thin in the shape of a thread in order to enhance its pliability. In so doing, however, care should be taken that the band not be permitted to cut into the skin of the spectacle wearer owing to this thread-shaped thin region.

In the third embodiment as shown in FIG. 10 the upper end 12 of the band 10 is attached to the first segment 2 in a position farther forward than in the embodiments previously described and variants thereto. Near the upper end 12 runs an area 64 of the band 10, at first essentially parallel to the first segment 2 and at a certain interval from it. The area curved in the shape of an arc then attaches itself to this area 64, as also occurs in the previously described embodiments and has already been discussed in detail. This area 64, because of the forces predominating in the band 10, is bent slightly upward in the charged state, as shown in dash-dots in FIG. 10, which has the result of shifting the arc-shaped, curved area of the band 10 entirely upward. This is illustrated in FIG. 10 by a dot assuming the point v with the temple end piece in the uncharged state and w with the temple end piece in the charged state. This effect is advantageously accomplished particularly in conjunction with a soft connecting area 16, as has been provided for according to FIG. 1 through 3 and also in the embodiment shown in FIG. 8, in such a manner that the connecting area 16 is pulled even farther forward and upward than is the case in the embodiment shown in FIG. 1 and 2, so that the effect described with reference to FIG. 2 of automatically hooking behind the ear is even further enhanced.

In addition, the in embodiment according to FIG. 10 the area 64 constitutes a soft area, should it come into contact with the ear.

The fourth embodiment as seen in FIG. 11 and 12 differs from the preferred embodiment essentially through the fact that the entire temple end piece is made of one and the same material, viz. of the soft material of band 10. For purposes of adapting to this choice of material the first segment 2 and the second segment 6 will have a relatively large cross-sectional profile, as may be seen especially in FIG. 12. By means of this the unit composed of the two segments 2 and 6, despite the soft material, is lent the requisite stiffness and inherent stability. An especial advantage of the embodiment shown in FIG. 11 and 12 is the possibility of simple production by means of one-piece injection molding of plastic.

For proving the favorable properties of the temple end piece according to the invention different tests were carried out, which are explained in detail in the following by referring to the FIGS. 13 to 21. As defined herein, the term "Impression Test" is intended to refer to the following test procedure as explained with reference to the FIGS. 13 to 18.

A temple end piece with the embodiment according to the FIGS. 1 to 3 was examined, its band 10 consisting of the material "Desmopan 786" already mentioned above. The band 10 had a circular profile as shown in the FIG. 7a with a medium diameter of 2.1 mm. In the FIG. 14 the two end points X and Y of the third segment 8 of the examined test object 66 are shown. These two end points X and Y are to be found on the center line of the band 10 forming the third segment 8 at the points at which the third segment 8 changes over into the first segment 2 resp. the second segment 6. The two end points x and y are connected by a line segment S, which, in the case of the test object described here, has a length of 45 mm. The greatest distance between the line segment S and the center line of the band 10 was about 9 mm in the case of the test object.

In the Impression Test a cylindrical test body 68 made of a plastic modeling mass was pressed against the band 10, whereby an impression 70 of the band 10 was produced in the plastic modeling mass. In this Impression Test the dimensions of this impression serve as measure for the adaptability of the band 10 forming the third segment 8. The properties of the plastic modeling mass were found out in a preliminary test. As plastic modeling mass a mixture on the basis of kaolin, zinc oxide, chalk, pigments, waxes and oils served, as it is sold by the company Pelikan AG, Hannover, under the term Plastilin 680. Such a modeling mass was filled in a vessel that is open at the top 72 (see FIG. 13) and was flattened such that a flat, even surface 74 resulted. A steel ball 78 having a diameter of 10 mm and being attached to a support 76 was pressed into this surface at a temperature of 20° C. and at a relative atmospheric moisture of 56%. The feed of the steel ball 78 was effected perpendicularly to the surface 74 at a feed rate of 1 mm/min. The feed lasted until the resistance which the modeling mass in the vessel 72 put up to the further feed of the ball 78 had reached the value 1.0N. At this moment the direction of feed was immediately reversed, i.e. the ball 78 was then removed from the surface 74 at unchanged speed, however, in the opposite direction of movement. In this preliminary test the ball 78 produced an impression of a diameter of 2.2 mm in the surface 74.

From the modeling mass with the properties defined by the preliminary test explained above the homogeneous, cylindrical test body 68 was formed, which had a diameter of 10 mm. The cylindrical test body 68 was fixed to a support 80 such that half of the surface shell of the test body 68 was exposed at the bottom, as show the FIGS. 14 and 15.

The test object 66 in the form of the temple end piece described already above was clamped in a clamping device 82, which essentially consists of two clamping jaws 84 and 86. The two clamping jaws 84 and 86 contact only the second segment 6 and thus hold the temple end piece resp. the test object 66 without contacting the third segment 8 of the temple end piece and preventing it from a deviation under the test conditions described in the following. The second segment 6 was held at clamping points U and V, which had a distance of about 34 mm from each other.

The temple end piece resp. the test object 66 and the test body 68 were arranged relative to each other such that the line segment S ran perpendicularly to the longitudinal axis of the cylindrical test body 68. This means in other words that the longitudinal axis of the cylindrical test body 68 runs perpendicularly to the drawing plane of the FIG. 14, whereas the line segment S runs in the drawing plane of the FIG. 14.

The test body 68 was then moved in the direction of the test object 66 along a straight movement path T, which is dash-dotted in the FIG. 14. The path of movement T is defined by the path along which the central point of the cylindrical test body 68 moves; the central point of the cylindrical test body 68 lies in the longitudinal center thereof on the longitudinal axis thereof. The path of movement T runs perpendicularly to the line segment S, halves the latter and cuts the band 10 as well as the second segment 6 each centrally. The clamping points U and V each had the same distances from the path of movement T, so that, like the end points of X and Y, they were symmetrical to the path of movement T.

For producing the impression 70 of the band 10 in the test body 68 the latter was moved along the path of movement T described above at a feed rate of 1 mm/min. in the direction of the band 10 at a temperature of 20° C. and a relative atmospheric moisture of 60%. This movement was continued until the contact pressure force of the test body 68 against the band 10 had reached the value 0.5N. Then the direction of movement of the test body was reversed, i.e. it was removed from the band 10 again.

The impression 70 produced by the pressing explained above is shown in the FIGS. 16, 17 and 18. The FIG. 16 shows a plan view of the cylindrical test body 68 at an alignment of the test body 68 such that the impression 70 is arranged centrally at the test body, i.e. that in the FIG. 16 the left end and the right end of the impression 70 each have the same distance from the adjacent surface line limiting the test body 68. As can be seen especially from the FIG. 18, the depth of the impression 70 changes over its length. The greatest depth of the impression 70 is marked with t. Also the breadth of the impression 70 changes over its length; the greatest breadth of the impression 70 is marked with b. The distance between the left and right ends of the impression 70 in the FIG. 16, which is identical with the length l of an even projection of the impression 70, is furthermore characteristic of the impression.

Several measurements were carried out from which the following mean values for the length l, the breadth b and the depth f resulted:

l=3.4 mm
b=1.2 mm
t=0.11 mm
l×b=4.08 mm²

Thus, it was shown that the tested band 10 has a high adaptability as it produces a large area of impression already at relatively low stress, which means that the pressures produced by the band 10 when resting against a body are low. Also the relatively small depth t shows that the pressures are low. Finally, the relatively great length l of the impression shows that the band puts up small resistance to a change of its own curvature and adapts itself well to the curved body. This means in other words that the band 10 has a good adaptability.

The deviation of the band 10 along the path of movement T, which was caused in the above-mentioned test, was 2.0 mm. The Impression Test was repeated under otherwise equal conditions, the test object, however, having been rotated resp. deflected about the line segment by 90° C. from its position shown in FIG. 14. This means in other words that the path of movement T did not cut the band 10 as well as the second segment 6 centrally, but ran perpendicularly to the plane defined by the band 10 and the second segment 6. During the pressing-on of the test body 68 the band 10 was thus not deflected in the direction of the second segment 6, but transversely. The deviation achieved thereby was 4.1 mm under otherwise equal conditions. This means that the band 10 can be more easily deflected transversely to the plane defined by the second segment 6 and the third segment 8 than in this plane. The low resistance to deformation of the band 10 perpendicularly to the mentioned plane is especially useful as the band 10 thus can be deformed and adapts itself practically without resistance at the skull essentially perpendicularly to the contact surface. In the mentioned plane, however, the resistance to deformation is higher; this is useful as in this plane the holding forces that are necessary for holding the spectacles have to be exerted.

In an especially advantageous embodiment of the temple end piece according to the invention it is thus provided that for the impression produced in the way as described above in detail $$l \times b \geq 3.5 \text{ mm}^2$$

is valid. This means that the impression shall have at least the size indicated by the above relation. In the advantageous embodiment of the invention it is further provided that the depth t is less than or equal to 0.12 mm. It is finally provided in the advantageous embodiment of the invention that the length of the impression is larger than 2.8 mm.

In the following as defined herein, the term "Deflection Test" is intended to refer to the following test procedure as a second test arrangement are explained with reference to the FIGS. 19 and 20. This Deflection Test again is to describe the adaptability of the band 10 quantitatively.

The test object of the Deflection Test corresponds to the test object of the Impression Test explained above in detail. Therefore, a repeated detailed description of the test object should be unnecessary.

As shows the FIG. 20, the test arrangement of the Deflection Test comprises a clamping device 88, which holds the temple end piece at a rectilinear elongation of its first segment 22 such that the whole temple end piece protrudes essentially freely from the clamping means 88. To the test arrangement furthermore a rod-shaped test body 90 belongs which has a profile in the form of an equilateral, regular hexagon whose edge length q is 21 mm. This test body 90 was pressed with one of its edges against the band 10 forming the third segment 8 so that a contact point W was produced at the point of contact between the test body and the band, the deviation of which was measured as a function of the force acting at the point of contact W.

The test body 90 and the clamped test object 66 were moved relative to each other along a path of movement G represented double dash-dottedly in the FIG. 20, which path runs through the contact point W and the longitudinal central line of the test body 90 and moreover cuts the longitudinal axis H of the first segment 2 of the test object 66, which axis is represented dash-dottedly in the FIG. 20, namely at an angle $\beta$ of 30°. The test body 90 and the test object 66 were arranged relatively to each other such that at the moment at which the test body 90 and the test object 66 during the movement of the test body 90 in the direction of the band 10 contact each other for the first time the contact point W has a distance p from the longitudinal axis H of 16 mm.

The test body 90 was moved in the direction of the band 10 at a feed rate of 1 mm/min., and the contact pressure force between the test body 90 and the band 10 as well as the deviation x of the band 10 caused by this contact pressure force at the contact point W along the path of movement G were measured. The result of this measurement is represented in the FIG. 19 as curve x. Furthermore, a second series of measurements was carried out, in which the test body 90 was pressed against the band 10 perpendicularly to the drawing plane of the FIG. 20, the longitudinal central line of the test body 90 running parallel to the longitudinal axis H of the first segment 2 and the distance p being 28 mm. The deviation y of the contact point W of the band 10 measured under these test conditions in the direction of the path of movement of the test body is shown in the FIG. 19 as curve y.

The Deflection Test results show that in the case of the tested force region up to contact pressure forces of 400 mN there is an essentially linear connection between the deviation x resp. y and the contact pressure force F. Relatively large deviations are already achieved by relatively low contact pressure forces F. As these deviations essentially are not caused in that the band 10 expands under stress, but in that the band 10 changes its shape and bends off at the contact point W about the edge of the test body 90 there with a relatively small radius of curvature, the measured deviations x and y are a measure for the adaptability of the band 10. It is striking and favorable in this connection again that with the same force the adaptability resp. the deviation y perpendicularly to the drawing plane of the FIG. 20 is clearly larger than the adaptability resp. the deviation x when applying the contact pressure force along the path of movement g in the drawing plane of the FIG. 20. This means that the third segment 8 of the temple end piece that is formed by the band 10 is deformable practically without resistance essentially perpendicularly to the surface of the skull against which it abuts, in the case of tensile load in the temple shaft attached to the temple end piece, still molds itself well to the furrow between ear and skull, however, puts up the necessary resistance to this tensile load.

In the advantageous embodiment of the invention it is provided that $$x \geq Fmm/200mN$$

is valid for the deviation x, i.e. that in the region of the contact pressure forces F from 0 to 400 mN that is considered here the deviation has at least the limiting value indicated by the above-mentioned inequation. It is further provided in the advantageous embodiment of the invention that $$y \geq Fmm/50mN$$

is valid for the deviation y, i.e. that in the region of the contact pressure force F from 0 to 100 mN considered here the deviation y has at least the limiting value indicated by the above-mentioned inequation.

Preferably it is even provided that $$y \geq Fmm/25mN$$

is valid.

As defined herein, the term "Adaptability Test" is intended to refer to the following test procedure as described with reference to the FIG. 21. In this Adaptability Test the same test object 66 is examined, as it has already been examined in the Impression Test, so that a repeated detailed description of the test object 66 is unnecessary. The Adaptability Test arrangement comprises a clamping device 92 in which the first segment 2 of the temple end piece forming the test object 66 is fixedly clamped, namely such that the second segment 6 and the third segment 8 of the temple end piece are not taken by the clamping device 92 and accordingly can be deflected without hindrance.

A rod-shaped test body 94 belongs also to the test arrangement according to FIG. 21. The profile of this test body has the shape of an equilateral symmetrical octagon and a width across flats r of 35 mm. (The width across flats r is the distance between two parallel sides of the rod-shaped test body 94). The test body 94 like the test body 90 of the Deflection Test arrangement consists of a material which is not deformed under the test conditions.

Test body 94 was moved along a path of movement G relatively to test object 66. This path of movement extends in parallel with longitudinal axis H of the first segment 2 of test object 66, the distance s between the path of movement G and the longitudinal axis H being 29 mm. The straight path of movement G extended perpendicularly to the longitudinal center line of test body 94 and also centrically through band 10. Test body 94 was so rotated about its longitudinal center line that two of its sides were aligned in parallel with the path of movement G as well as the longitudinal axis H. Finally the longitudinal center line of test body 94 extended at right angle to the plane defined by the path of movement G and longitudinal axis H.

At the beginning of the Adaptability Test, test body 94 did not touch test object 66. Test body 94 was moved toward band 10 and a first contact with band 10 was finally established at one edge 96 of test body 94. During the further movement of test body 94 a second contact with band 10 was established at edge 97 which is adjacent to edge 96. Finally a third contact with band 10 was established at a further edge 98 of test body 94 so that the band 10 finally rested against the three different edges 96, 97 and 98 of the test body 94 without that either band 10 or test object 66 were damaged thereby.

The above described threefold contact of band 10 with test body 94 came about because band 10 was deformed and adapted itself to the profile of test body 94. This can be seen from FIG. 21 which shows the situation when the contact with all three edges of the test body has just been established. The pressing force between test body 94 and test object 66 was in the range from 1.8 to 2.3N in the case of several samples of test object 66.

The fact that band 10 came to rest against test body 94 along three of its edges in the test described above is proof of the great adaptability of band 10 and of the third segment 8 of the tested temple end piece, respectively. Therefore the temple end piece according to the invention is preferably adaptable to an extent which enables the described three-edge contact. The prevailing pressing force preferably shall not be more than 2.5N.

The temple end piece for a temple of a spectacle frame has a unit stable in a form composed of an essentially horizontal first segment and a second segment curving downward to the rear in the shape of an arc. Connected to this unit is a third segment formed by a soft, flexible band, the upper end of which is attached to the first segment and the lower end of which is permanently connected to the lower end of the second segment. This band extends in the uncharged state of the temple end piece curved essentially in the shape of an arc, in fact, in a manner similar to the second segment. In its longitudinal direction the band is neither stretchable nor compressible. By virtue of its high flexibility the band fit the shape of the auricle and/or head of the spectacle wearer when the spectacles are worn in place, so that a large contact area with lower pressures will adjust itself, and any and all pressure points are prevented in this contact area. Owing to the constancy of length of the band the flexible configuration will not detract from the stability of support for the temple of the spectacles.

We claim:

1. Temple end piece for the temple of a spectacle frame comprising: a first essentially straight section extending in the longitudinal direction of the temple; a second segment which extends essentially downwardly with respect to said first segment, said second segment being firmly connected at its upper end to the first segment whereby the first and the second segment form a unit having an essentially stable form; and a third flexible segment which, when unstressed, has an arcuate configuration for fitting in the furrow between the head and the auricle of the wearer with the outer side of the curvature of said third segment facing the second segment, said third segment having an upper end attached to the first segment or to the second segment near its juncture with the first segment, and having a lower hook shaped region connected to the lower end of the second segment, said hook shaped region of said third segment being curved in such a manner that a tangent to the third segment in at least part of said region forms an angle of less than 90° with the longitudinal axis of the first segment, said third segment being essentially unstretchable and incompressible in its longitudinal direction, and, when deformed while being worn, said third segment essentially adapting itself to the individual form of the furrow of the wearer.

2. A temple end piece according to claim 1, wherein said angle is greater than 60°.

3. A temple end piece, according to claim 2, wherein said angle lies in the range of 60° to 80°.

4. A temple end piece according to any one of claims 1 through 3, wherein in the unstressed state of the temple end piece, the first and second segments define a plane and said third segment is additionally curved in a plane displaced from the plane defined by the first and the second segments.

5. A temple end piece according to any one of claims 1 through 3, wherein the second segment has an arcuate configuration with an inner side of curvature which faces toward said third segment.

6. A temple end piece according to any one of claims 1 through 3, wherein the second segment and the third segment each transform at their upper end smoothly and without discontinuity into the first segment.

7. A temple end piece according to claim 6 wherein, when unstressed, the third segment has a portion which extends essentially parallel to the first segment and is spaced therefrom before transforming into the first segment.

8. A temple end piece according to claim 1, wherein said second segment has a portion of reduced cross-section in the end of the hook-shaped region which is connected to said second segment.

9. Temple end piece according to claim 1 wherein the first segment, the second segment and the third segment are made of the same material.

10. A temple end piece according to claim 1, wherein the first segment and the second segment are each made of a firm, first material and the third segment is made of a second material which is softer than said first material.

11. A temple end piece according to claim 10 wherein said second material is selected from the group consisting of silicone rubber, thermoplastic polyurethane elastomer, polyether-blockamide, soft polyvinyl chloride and polyethylene.

12. A temple end piece according to claim 11, wherein said second material has a Shore-D-hardness, measured according to DIN 53505 in the range of 10 to 55.

13. A temple end piece according to any one of claims 1 to 3 being of a material and dimensions such that, when subjected to the Impression Test, said third segment forms an impression with an area 1×b being greater than or equal to 3.5 mm² said Impression Test comprising the step of impressing said third segment in a cylindrical test body having a diameter of 10 mm and consisting of a homogeneous plastic modeling clay in which a steel ball with a diameter of 10 mm produces an impression with a diameter of 2.2 mm at a temperature of 20° C. and a relative humidity of air of 60%, if the steel ball is pressed into a plane surface of the modeling clay with a feeding speed of 1 mm per minute until the pressing force has reached 1.0N, said third segment being arranged relative to the test body for testing in such manner that a line segment connecting the end points of the third segment extends perpendicular to the longitudinal centerline of the cylindrical test body, the third segment and the test body being moved along a straight path of movement relative to each other, said path of movement extending perpendicular to said line segment, bisecting it and centrally intersecting the third segment as well as the second segment.

the third segment and the test body at temperature of 20° C. and a relative humidity of air of 60% being moved toward each other with a feeding speed of 1 mm per minute until the pressing force of 0.5N is reached, l being the length of the plane projection of the impression of the third segment, and b being the maximum width of the impression of the third segment.

14. A temple end piece according to claim 13, being of a material and dimensions such that, when subjected to said Impression Test, the maximum depth t of said impression of the third segment is equal to or less than 0.12 mm.

15. A temple end piece according to claim 14 being of a material and dimensions such that, when subjected to said Impression Test, the length l of the plane projection of said impression of the third segment is equal to or greater than 2.8 mm.

16. A temple end piece according to claim 1 being constructed of a material and dimensions such that, when subjected to a Deflection Test, the deflection x of the third segment is equal to or greater than Fmm/200mN, said Deflection Test comprising the steps of deflecting said third segment with a rod-shaped test body having a symmetrical hexagonal profile whose edge length is 21 mm, said test body being pressed with one of its edges against a contact point of the third segment with a feeding speed of 1 mm per minute, the third segment, for producing the deflection x thereof, and the test body being moved relative to each other along a straight path of movement which extends through said contact point and perpendicular to the longitudinal centerline of said test body and through said longitudinal axis of the first segment of the temple end piece at an angle of 30°, the distance between said contact point and said longitudinal axis of said first segment at the time when said test body touches said contact point for the first time being 16 mm, and x being the deflection of said third segment measured along said path of movement, and F being the pressing force causing said deflection.

17. A temple end piece according to claim 1 wherein a when subjected to a Deflection Test, deflection y of the third segment is equal to or greater than Fmm/50N, said Deflection Test comprising the steps of deflecting said third segment with a rod-shaped test body having a symmetrical hexagonal profile and an edge length of 21 mm being pressed with one of its edges against a contact point on said third segment with a feeding speed of 1 mm per minute, the third segment, and said test body being moved relative to each other during testing along a straight path of movement which extends through said contact point and perpendicular to the longitudinal centerline of said test body and through said longitudinal centerline and furthermore extends perpendicular to the plane defined by the longitudinal axis of said first segment, said longitudinal centerline of said test body extending in parallel with the longitudinal axis of said first segment, the distance between said contact point and said longitudinal axis of said first segment being 28 mm at the time when said test body touches said contact point for the first time, and y being the deflection of said third segment measured along the path of movement, and F being the pressing force causing the deflection.

18. A temple end piece according to claim 17, wherein said deflection y is equal to or greater than Fmm/25mN.

19. A temple end piece according to claim 1 being of a material and dimensions such that no damage results when subjected to an Adaptability Test in which said third segment is brought into contact with three edges of a rod-shaped test body, said test body having a symmetrical octagonal profile with a width across flats of 35 mm, said Adaptability Test comprising moving said test body, and said temple end piece relative to each other during testing along a straight path of movement which extends in parallel with the longitudinal axis of the first segment of said temple end piece and centrally through said third segment, and furthermore extends perpendicular to the longitudinal center line of said test body, the distance between said path of movement and the longitudinal axis being 29 mm, said test body being so aligned that two of its sides extend in parallel with said path of movement and said longitudinal axis, and said temple end piece being held alone at its first segment when said third segment rests against said test body.

20. A temple end piece according to claim 19, wherein the pressing force required to bring said third segment into contact with the three edges of said test body is less than 2.5N.

21. Temple end piece for the temple of a spectacle frame comprising: a first essentially straight section extending in the longitudinal direction of the temple; a second segment which extends essentially downwardly with respect to said first segment, said second segment being firmly connected at its upper end to the first segment whereby the first and the second segment form a unit having an essentially stable form; and a third segment for fitting in the furrow between the head and the auricle of the wearer, said third segment comprising a flexible band made of rubber or an elastic plastic having an upper end attached to the first segment or to the second segment near its juncture with the first segment, said third segment having a lower end connected to the lower end of the second segment, said third segment when unstressed having an arcuate configuration with the outer side of the curvature facing backward to the second segment, said third segment being essentially unstretchable or compressible in its longitudinal direction and, when stretched while being worn, said third segment essentially adapting itself to the individual form of the furrow of the wearer, wherein the first segment and the second segment have a core, which affords stability of form to the unit consisting of these two segments, and that said core bears a cladding made of a material that is simultaneously the material of the third segment.

* * * * *